United States Patent
Kim (10) Patent No.: US 6,330,577 B1
(45) Date of Patent: Dec. 11, 2001

(54) APPARATUS AND METHOD FOR DISPLAYING FONT INFORMATION BY USING PREVIEW WINDOW

(75) Inventor: Hyun-Don Kim, Seoul (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/173,183

(22) Filed: Oct. 15, 1998

(30) Foreign Application Priority Data

Oct. 15, 1997 (KR) ................................ 97/52824

(51) Int. Cl.⁷ ................... G06F 17/21; G06F 3/00
(52) U.S. Cl. ............... 707/542; 707/535; 345/471; 345/788; 345/815; 345/822
(58) Field of Search ................... 345/336, 337, 345/338, 467, 141, 471, 788, 815, 822; 707/527, 531, 542, 535, 529

(56) References Cited

U.S. PATENT DOCUMENTS

| | | | |
|---|---|---|---|
| 5,001,697 | * | 3/1991 | Torres .................................. 345/472 |
| 5,307,086 | * | 4/1994 | Griffin et al. ........................ 345/808 |
| 5,495,577 | | 2/1996 | Davis et al. . |
| 5,500,931 | | 3/1996 | Sonnenschein . |
| 5,513,342 | * | 4/1996 | Leong et al. ......................... 345/798 |
| 5,771,032 | * | 6/1998 | Cline et al. .......................... 345/786 |
| 5,995,101 | * | 11/1999 | Clark et al. .......................... 345/808 |
| 6,012,342 | * | 1/2000 | Blight et al. ......................... 345/703 |
| 6,144,389 | * | 11/2000 | Toshimoto et al. .................. 345/472 |

OTHER PUBLICATIONS

Microsoft Office 97 Released to Manufacturing Version, screenshots pp. 1–8, Nov. 1996.*

Lanugage Force, "Universal Translator (user's manual)", pp. 27 and 29, Dec. 1997.*

Anonymous, "LanguageForce Announces Worldwide Distribution Agreement with Ingram Micro", Businesswire, 233 words, Nov. 1997.*

* cited by examiner

Primary Examiner—Mark R. Powell
Assistant Examiner—Jeffrey Allen Rossi
(74) Attorney, Agent, or Firm—Robert E. Bushnell, Esq.

(57) ABSTRACT

An apparatus and method for displaying font information by using a preview window, when the user makes up a document, the sample of the desirable font is promptly shown to the user through the preview window. Accordingly, the user can effectively make up the document by promptly finding the suitable font for the document.

3 Claims, 9 Drawing Sheets

FIG. 1

(Prior Art)

APPARATUS AND METHOD FOR DISPLAYING FONT INFORMATION BY USING PREVIEW WINDOW

CLAIM OF PRIORITY

This application makes reference to, incorporates the same herein, and claims all benefits accruing under 35 U.S.C §119 from an application entitled Apparatus And Method For Displaying Font Information By Using Preview Window earlier filed in the Korean Industrial Property Office on Oct. 15, 1997, and there duly assigned Serial No. 97-52824 by that Office.

BACKGROUND OF THE INVENTION

1. Field of the Invention

The present invention relates to an apparatus and method for displaying font information of a word processor, and more particularly, relates to an apparatus and method for displaying font information by using a preview window of a word processor, which provides promptly finding a desirable font and effective making up a document by promptly showing a font sample through a preview window when a user makes up a document by using a word processor.

2. Background of the Related Art

Figure 1:
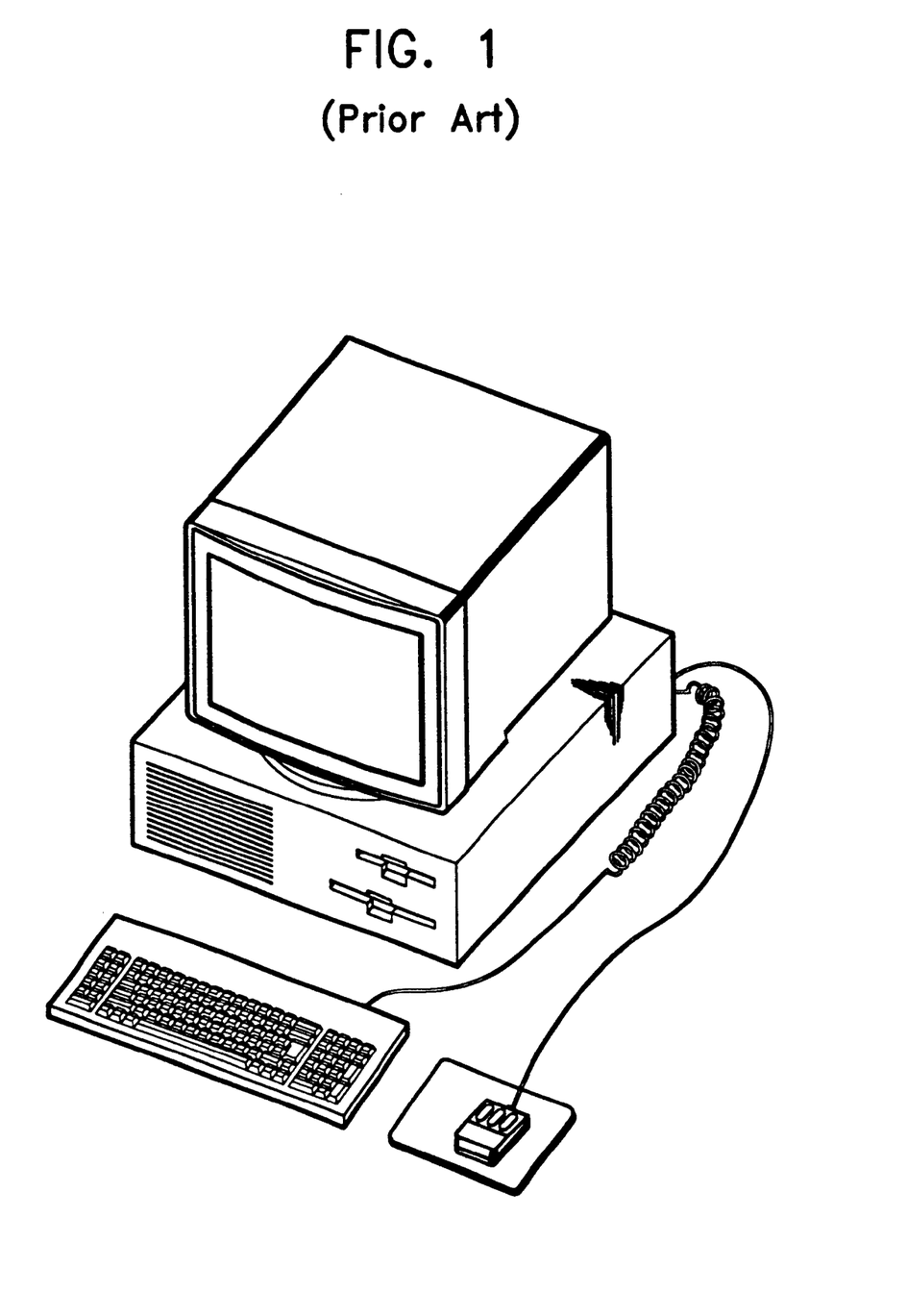
FIG. 1 is a perspective view illustrating a general personal computer.
Figure 2:
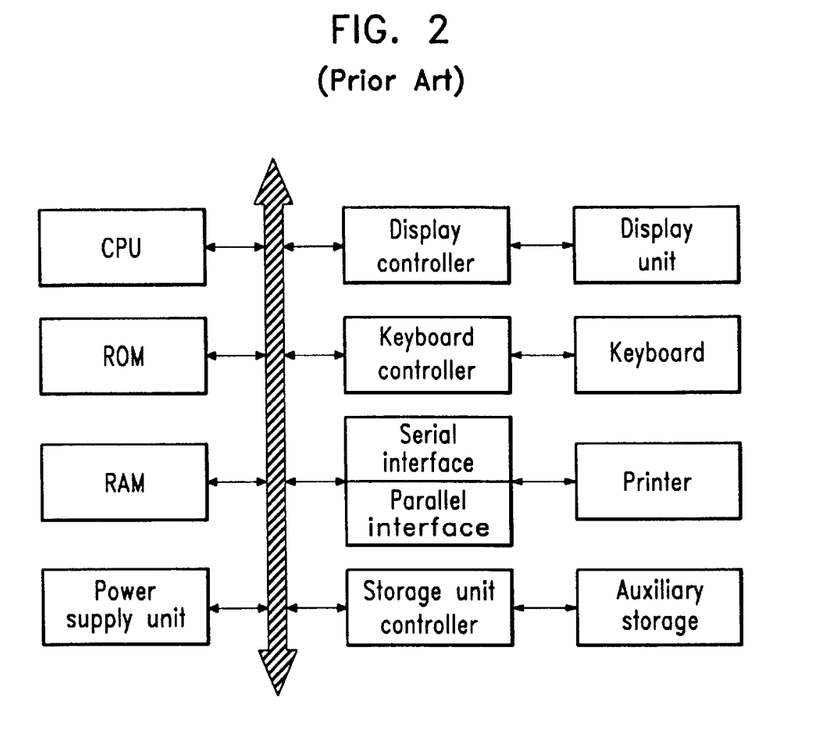
FIG. 2 is a block diagram of general computer hardware.
Figure 3:
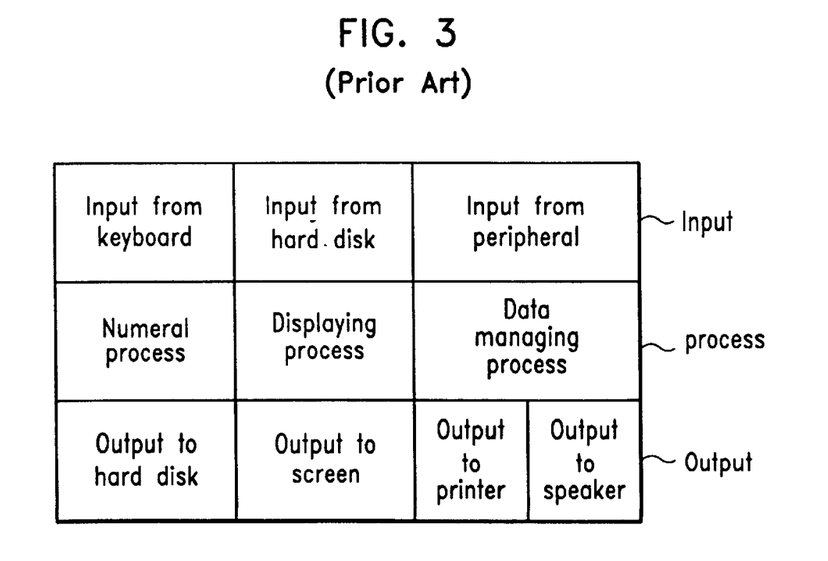
FIG. 3 is a functional block diagram of a general computer.

Recently, as computer technology has been widely spread, many applications have been increasingly developed. One of these applications is a word processor. The structure of a conventional hardware of the computer system for executing the word processing job is shown in FIGS. 1 and 2. Generally, functions which the computer performs are input/output of data and data processing, and they can be itemized as shown in FIG. 3. As it is generally known, the detailed description is omitted.

In the above-mentioned word processor, a user inputs a character after specifying a character shape by using an offered font from the word processor. For example, when the user selects "Arial" before inputting the character, all characters input into an inputting unit are input with a font corresponding to "Arial".

Recently, the kinds and numbers of fonts provided by the word processor are very diverse and increased, respectively. For executing the word processing job, it is required that the user can select a desirable font previous to actually generating characters via the keyboard. For example, see U.S. Pat. No. 5,495,577 to Mark E. Davis et al. entitled System For Displaying Insertion Text Based On Preexisting Text Display Characteristics, and U.S. Pat. No. 5,500,931 to Russell Sonnenschein entitled System For Applying Font Style Changes to Multi-Script Text.

Figure 4:
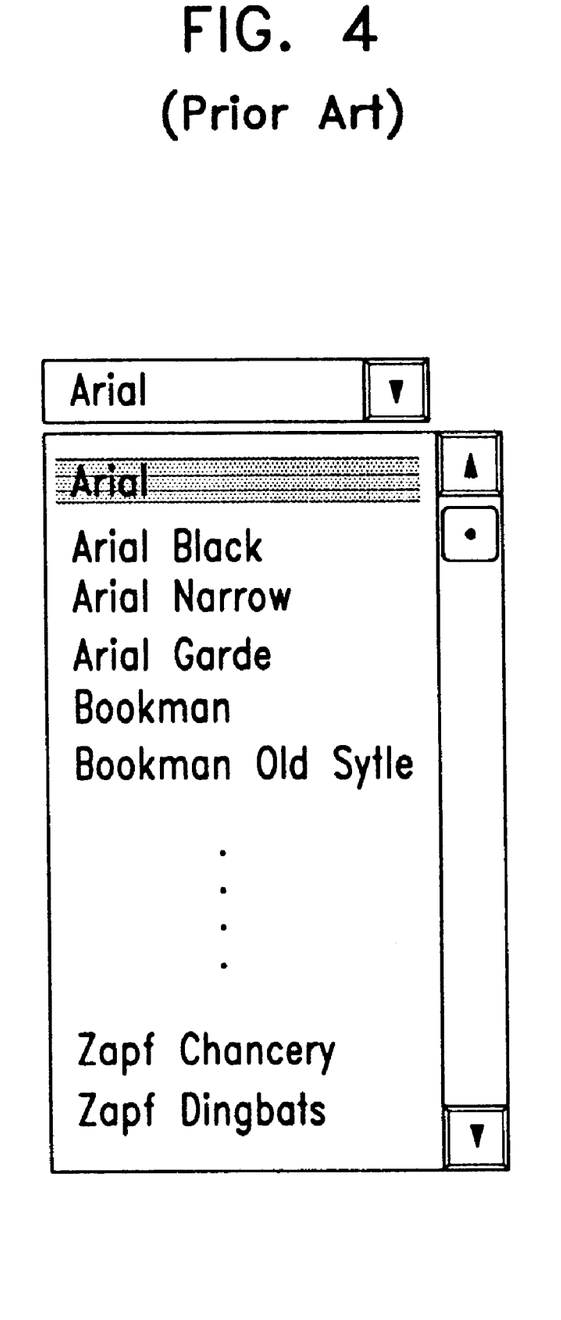
FIG. 4 shows a font selecting combo box and a list box, which are generally used.
Figure 5:
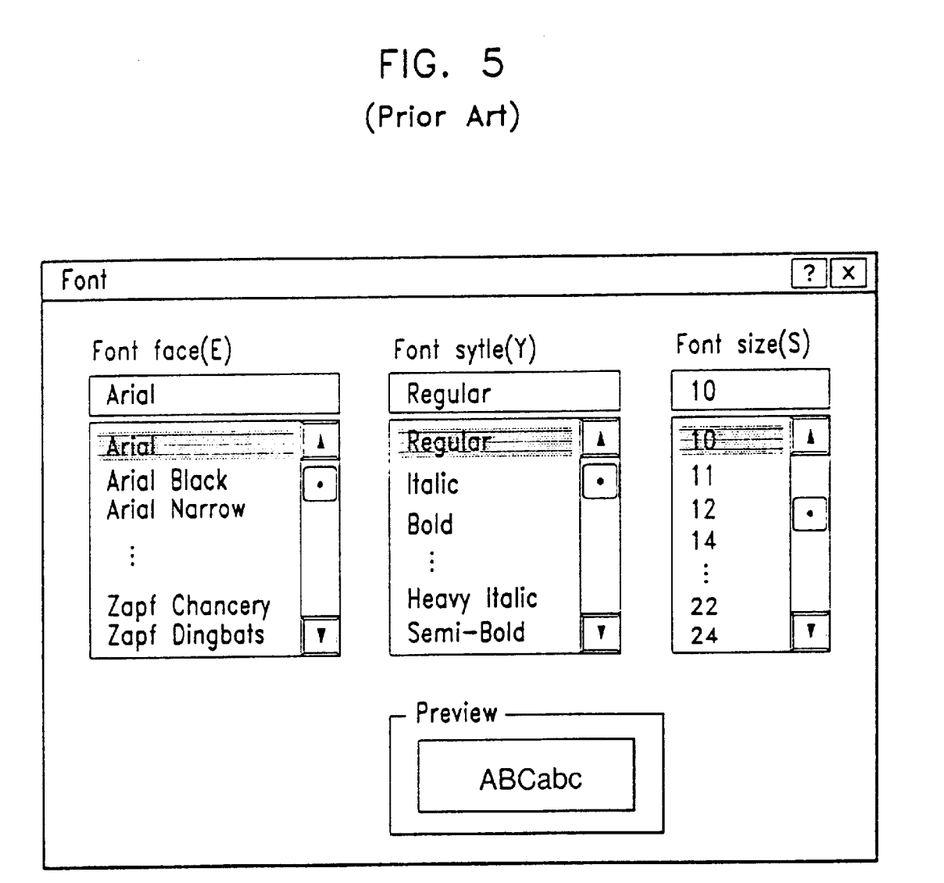
FIG. 5 shows a general font selecting dialog box for previewing a font shape to be selected.

Generally, however, there are two methods for selecting fonts as shown in FIGS. 4 and 5. First, as shown in FIG. 4, the user can select the desirable font using a font name through a font selecting combo box and a list box, wherein font names are arranged therein. The other method for selecting the desirable font is explained with referring to FIG. 5. The user can select the desirable font after confirming the font through a dialog box, which shows the font shape to be selected previously, as shown in FIG. 5. The feature of FIG. 5 is known in WordPerfect 8 for example.

In the first font selecting method using the font names, when the kinds of fonts are limited, all shapes of the fonts are memorized in a dictionary. Accordingly, the user can select the desirable font. But, recently, according to diversity of the kinds of fonts, it is a big burden for the user to select the font by using the font name.

In the mean time, for reducing the burden of the first font selecting method using the font name, the font is selected with previewing the font shape as shown in FIG. 5. Nevertheless, the word processing job is delayed because the user has to open the dialog box every time for selecting the desirable font.

Additionally, it is known that CorelDRAW™7 and WordPerfect®8 provide a font drop down menu on a property bar of displayed tool bars by clicking on a drop down arrow of the drop down menu to display a number of available font faces for selection, similar to that shown in FIG. 4. At this time, however, a preview window opens and displays characters of the current, or default, font, which differs from FIG. 4. By moving the pointer over and highlighting any of the displayed font faces, character samples of the selected font are displayed in the preview box, however the preview box does not change in size. The current font can then be changed to the font of the highlighted font face by clicking on the highlighted font face using the mouse.

SUMMARY OF THE INVENTION

Therefore, it is an object of the present invention to provide effectively making up a document for a user by promptly showing a desirable font sample, when the user makes up a document.

According to one aspect of the present invention, an apparatus for displaying font information by using a preview window includes: a font name storing unit for storing names of a plurality of fonts; a sample storing unit for storing samples corresponding to a plurality of fonts; a font list displaying unit for outputting and displaying a plurality of font faces from the font name storing unit; a sensing unit for sensing whether a font is selected from the displayed font faces and what kind of font is selected; a sample size adjusting unit for adjusting a sample to a predetermined size, wherein the sample corresponds to the selected font; a preview window for outputting and displaying the size-adjusted sample; and a control unit for controlling the elements for outputting and displaying one sample corresponding to the selected font to the preview window.

According to another aspect of the present invention, a method for displaying font information by using the preview window includes the steps of: displaying the font list when command for outputting the font list is received; determining whether one font is selected from the font list; generating the sample corresponding to the selected font and the preview window for outputting the sample when one font is selected; and displaying the generated sample to the preview window.

Preferably, whether the selected font is a language other than English or English is determined in the sample generating step. When the selected font is the language other than English, the sample is generated using both the language other than English and English. When the selected font is English, the sample is generated using English and numbers.

Moreover, the sample displaying step includes the substeps of: calculating a size of the generated font sample; determining whether the preview window is generated; generating the preview window to a size corresponding to the generated font sample when the preview window is not already generated and readjusting the font sample size to the size of the preview window when the preview window is generated; and transmitting and outputting the font sample to the preview window.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferred embodiments referring to the attached drawings.

In the following description, when the detailed description related to disclosed function and structure is unnecessarily obvious to the substance of the present invention, the detailed description will be omitted.

Figure 6:
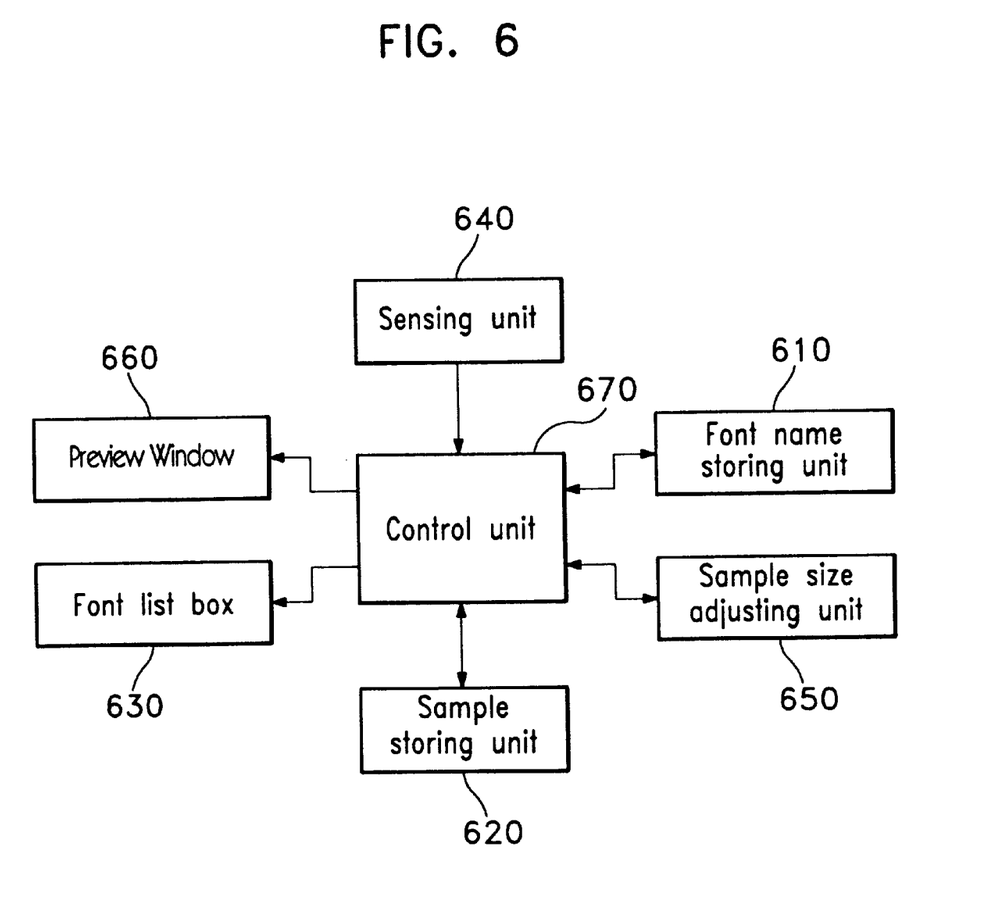
FIG. 6 is a block diagram illustrating an apparatus for displaying font information using a preview window, according to the present invention.

FIG. 6 is a block diagram illustrating an apparatus for displaying font information using a preview window, according to the present invention. According to the present invention, names of a plurality of fonts are stored in a font name storing unit 610 and samples corresponding to the it plurality of fonts are stored in a sample storing unit 620. Moreover, a plurality of fonts are output and displayed in a font list box 630. In the mean time, a sensing unit 640 senses whether one of the fonts is selected from the displayed fonts and what kind of font is selected; and a sample size adjusting unit 650 adjusts the font sample corresponding to the selected font to a predetermined size. Moreover, a control unit 670 controls each element for outputting and displaying the font sample corresponding to the selected font to the preview window 660.

Figure 8:
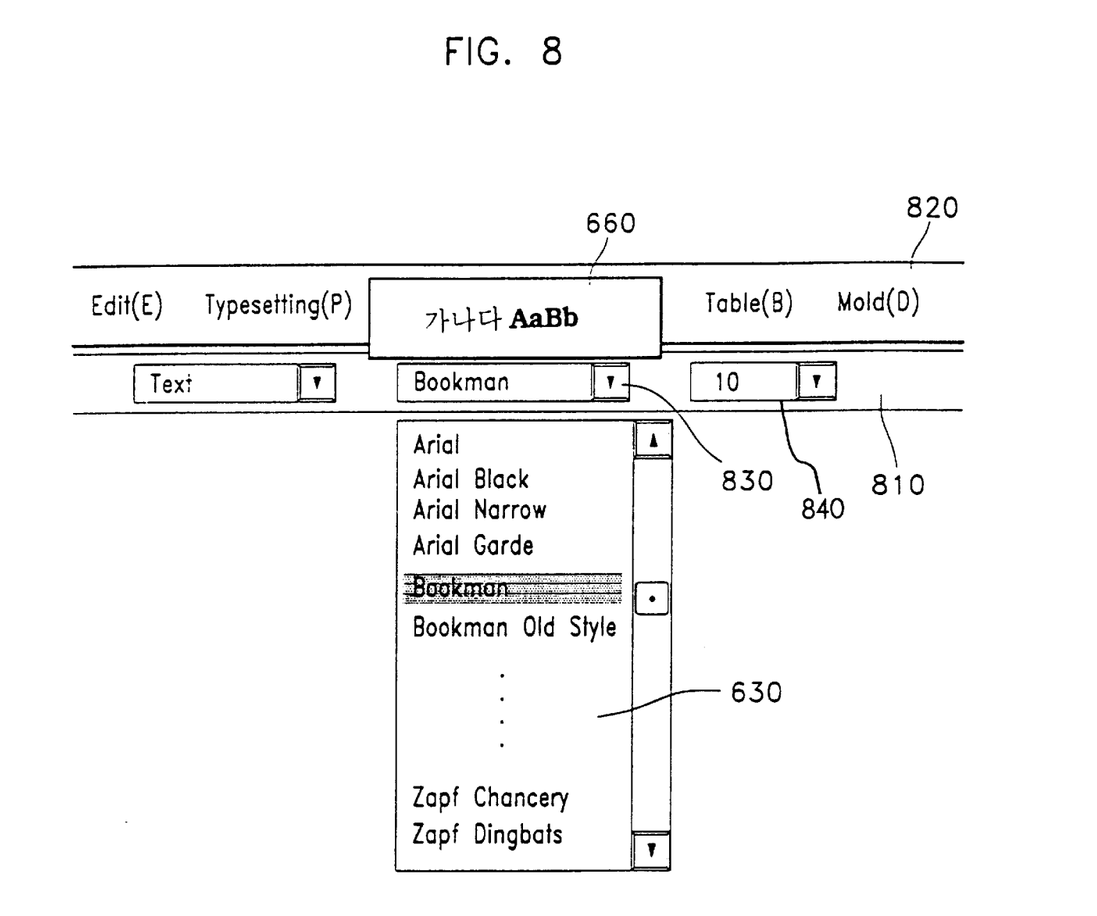
FIG. 8 is an example showing a sample of a selected font from a preview window, according to the present invention.

FIG. 8 is an example showing a sample of a selected font from a preview window, according to the present invention. When a user, using a mouse for example, clicks on combo box 830 of the controller, which is located in the tool bar (or property bar) 810, the list arranging the font names is output to font list box 630, accordingly, the currently selected font (for example, Bookman) appears highlighted (gray shading). When the user moves a pointer (not shown) over a desired one of the font names (for example, 'Arial') among the font names, the corresponding font sample (for example, 'ABCabc') is output to the preview window 660, without the user having to click the mouse.

Figure 9:
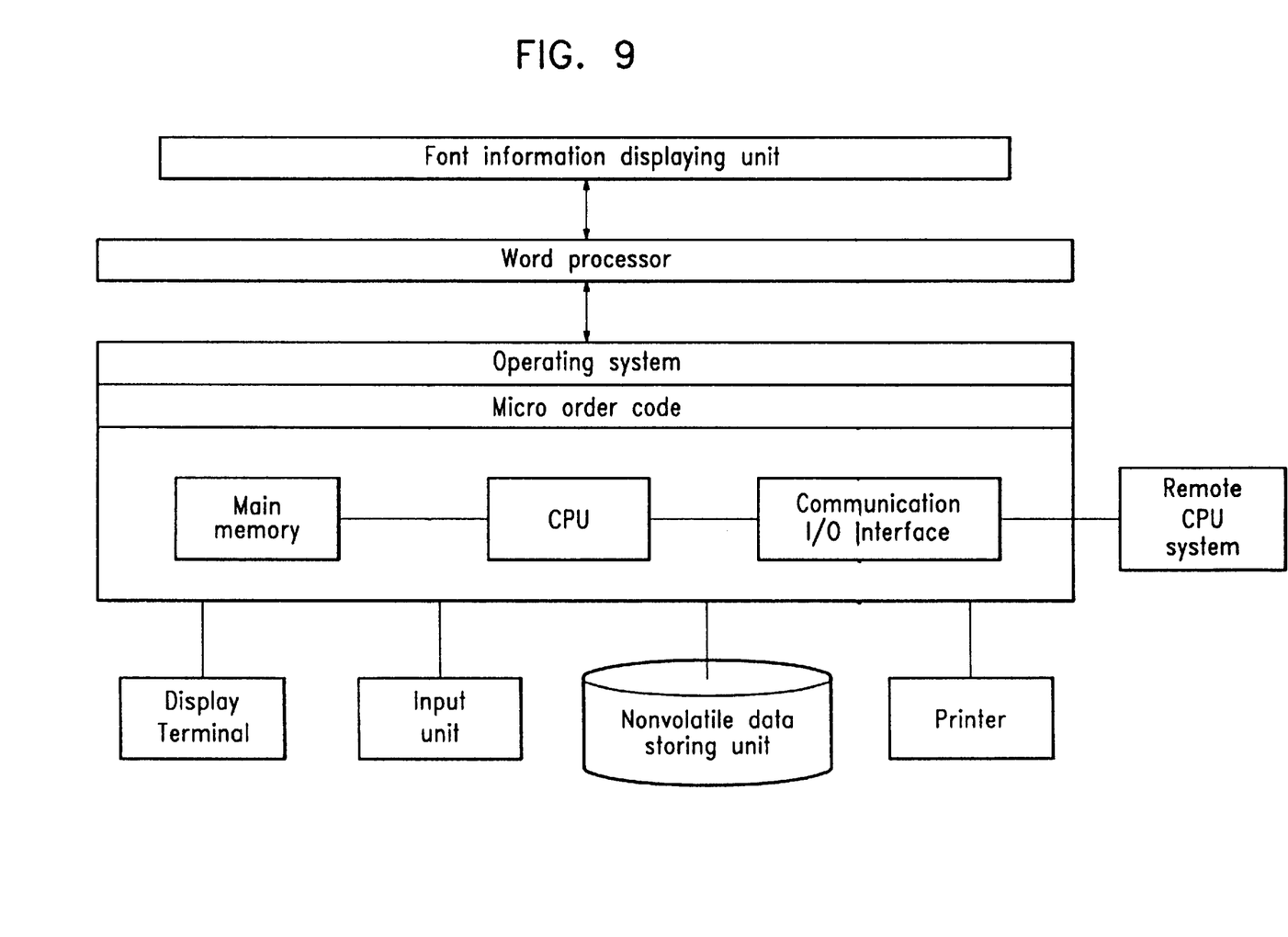
FIG. 9 is a schematic view illustrating an overall computer system, which executes the present invention.

The operation of the apparatus for displaying font information by using a preview window, according to the present invention, will be described hereinafter with referring to FIGS. 7 through 9.

Figure 7A:
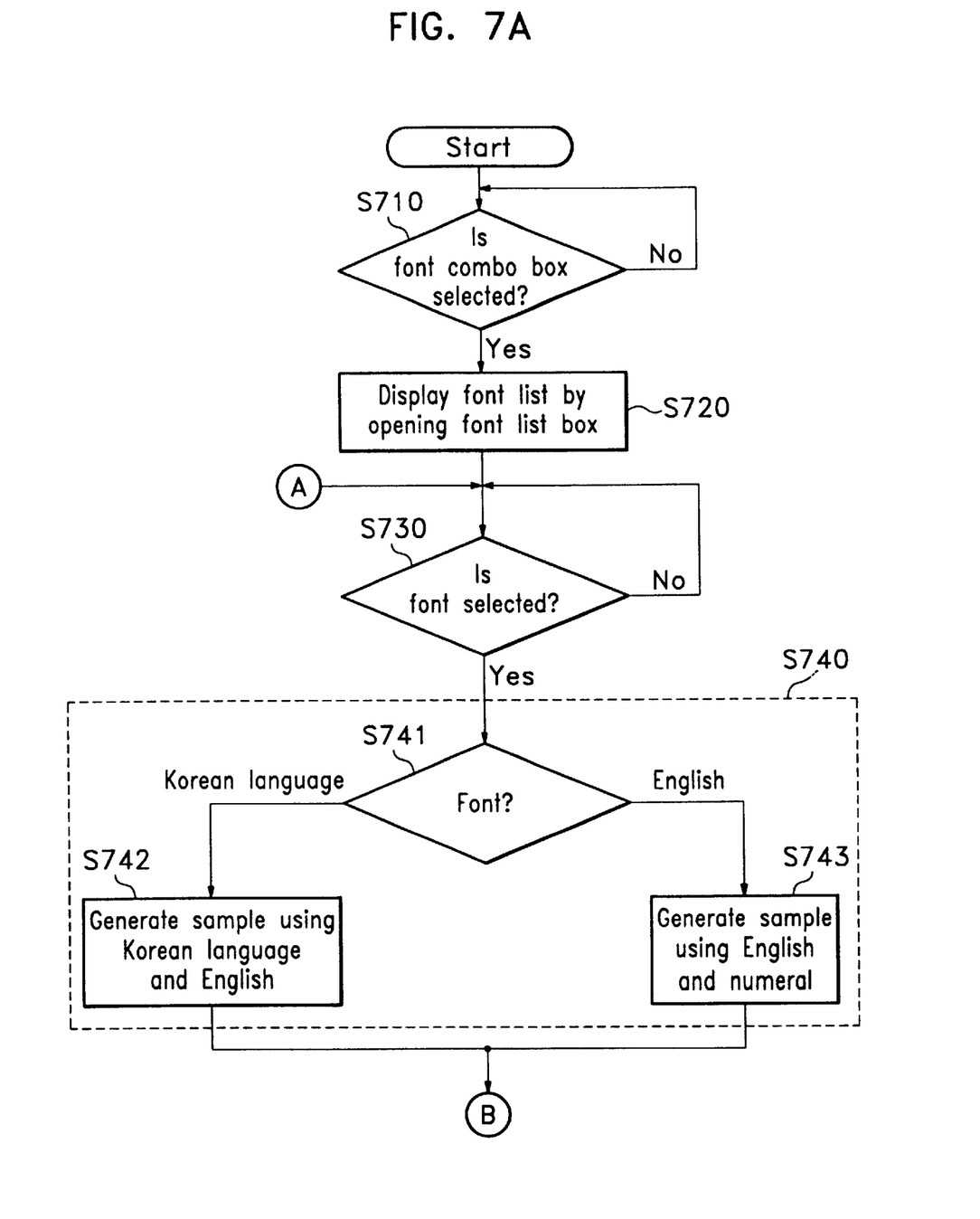
FIGS. 7A and 7B illustrate a flow chart illustrating a method for displaying font information by using a preview window, according to the present invention.
Figure 7B:
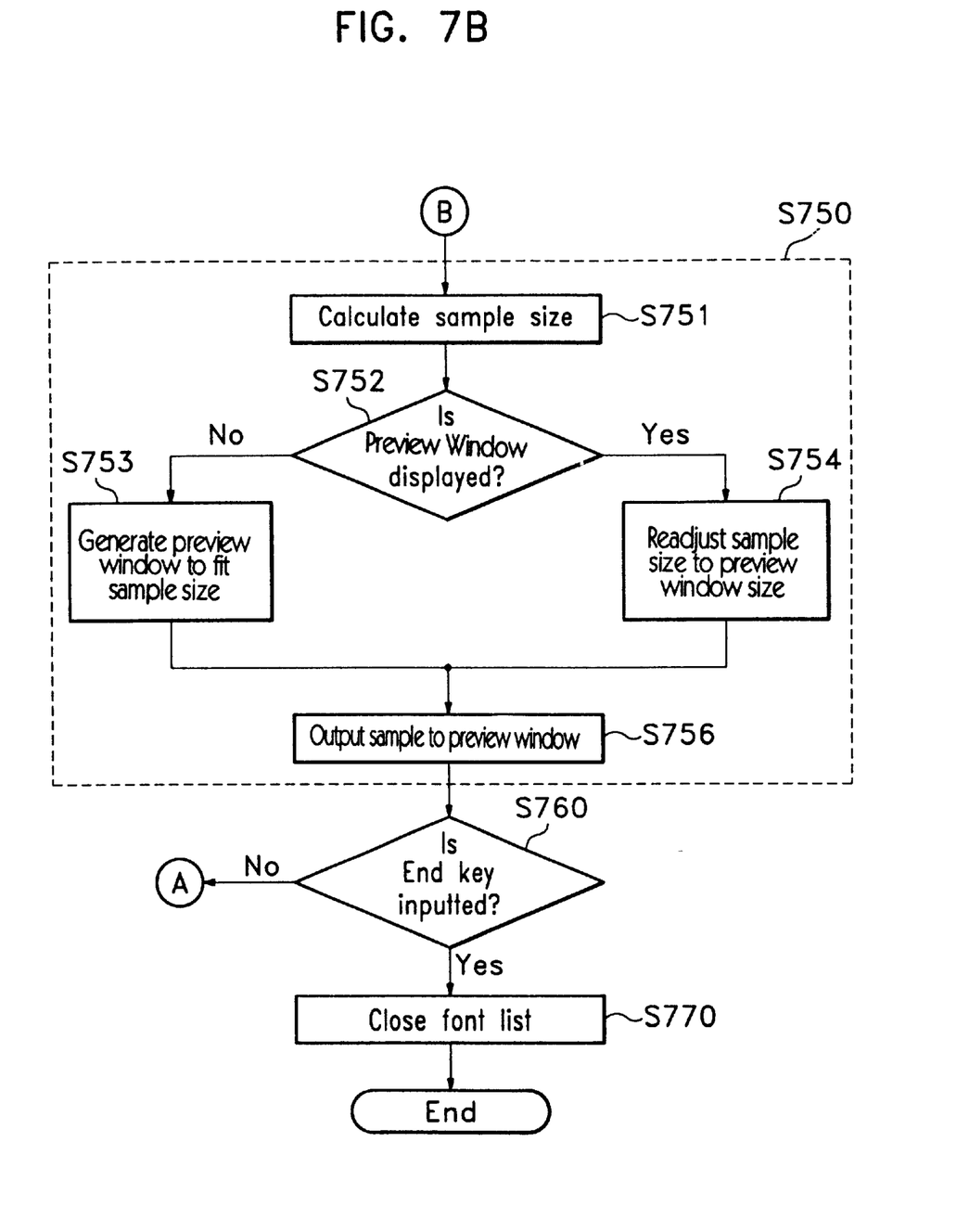

First, the control unit 670 determines whether or not the font combo box 830 is selected (step S710, FIG. 7A). In other words, the control unit 670 determines whether an output command of the font list is received when a user places a pointer over font combo box 830 and clicks on font combo box 830 using, for example, a mouse. Once is determined the font combo box 830 is selected, the control unit 670 opens the font list box 630 and displays the font list stored in the font name storing unit 610 (step S720). The font list is the list arranging the name of each font. After displaying the font list, the control unit 670 determines whether one of the fonts is selected, by a pointer being placed over the selected font without clicking, and what kind of font is selected (step S730), wherein the pointer is moved by any known method such as a mouse, keys on a keyboard, touch screen, or other known pointer devices.

When one font is selected in step S730, the sample corresponding to the selected font is generated (step S740). Then, the sample corresponding to the selected font is read from the sample storing unit 620 and generated for display.

With reference to the sample generating step S740 in detail, whether the selected font is a language other than English or English is first determined (step S741).

When the selected font is determined to be the language other than English (for example, the Korean language), in step S741, the sample is generated by using a combination of the language other than English and English characters (step S742) as shown in preview window 660 of FIG. 8. When the selected font in step S741 is English, the sample is generated by using the English characters and numerals (step S743). For example, the sample such as 'ABCabc123' is generated.

After generating the sample corresponding to the selected font (step S742 or S743), the generated sample is output and displayed in the preview window 660 (step S750) on menu bar 820, as shown in FIG. 8.

With respect to the sample outputting and displaying step S750, in detail, the generated sample size is first calculated (step S751) in response to the font size selected in font size controller 840. After calculating the generated sample size, whether the preview window 660 is displayed in the Graphic User Interface (GUI) of the currently used word processor is determined (step S752). In other words, it is determined whether the preview window 660 is open, as shown in FIG. 8 on menu bar 820, or closed.

When it is determined in step S752 that the preview window 660 is not generated, the preview window is generated corresponding to the size of the generated font sample (step S753). For example, because the preview window is not displayed on menu bar 820 when the user does not select a font in the font list box 630 as shown in FIG. 8, the preview window 660 has to be generated and displayed on menu bar 820 for outputting the font sample, which corresponds to the selected font. When it is determined in step S752 that the preview window is generated, that means that a font was previously selected by the user, and the newly generated font sample size relative to a newly selected font is readjusted (step S754) corresponding to the preview window size, which is previously generated. That is, in step S753 the size of preview window 660 is adjusted according to the font size, whereas the font sample size calculated in step S751 is adjusted to fit the currently generated preview window size in step S754.

Subsequently, the font sample is output and displayed in the preview window 660 (step S756). The process to output and display the sample in the preview window 660 is the same to the process to output a message to the preview window 660 in the GUI, accordingly, as it is generally known, the detailed description is omitted.

After outputting the generated sample to the preview window 660, it is determined whether an end key is input by the user (step S760). For example, the end key may be the 'ESC' key on the keyboard. When it is determined that the end key is input by the user, the opened font list box 630 is closed (step S770).

As above-mentioned, according to the present invention, when the user makes up a document, the sample of the desirable font is promptly shown to the user through the preview window. Accordingly, the user can effectively make up the document by promptly finding the suitable font to the document.

As the terms mentioned in the specification are determined based upon the function of the present invention, and they can be changed according to the technician's intention or a usual practice, the terms should be determined considering the overall contents of the specification of the present invention.

While there have been illustrated and described what are considered to be preferred embodiments of the present invention, it will be understood by those skilled in the art that various changes and modifications may be made, and equivalents may be scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but what the present invention includes all embodiments falling within the scope of the appended claims.

What is claimed is:

1. A method for displaying font information by using a preview window displayed on a screen of a display device in a computer system according to a word processor, comprising steps of:

determining whether a font combo box displayed on said screen is selected;

displaying a font list corresponding to a plurality of fonts when it is determined that said font combo box is selected;

determining whether one of said fonts is selected from said font list;

determining whether the selected font corresponds to the English language or a language other than English, when it is determined that one of said fonts is selected;

generating a font sample including characters of the English language and the language other than English, when it is determined the selected font corresponds to the language other than English;

generating a font sample including characters of the English language and numerals, when it is determined the selected font corresponds to the English language;

determining whether a preview window is currently displayed on said screen;

adjusting the size of said font sample to fit said preview window, when it is determined that said preview window is currently displayed on said screen;

generating the preview window, when it is determined that said preview window is not currently displayed on said screen, said preview window being generated to fit a predetermined size of said font sample; and displaying said generated font sample in said preview window.

2. The method as set forth and claim 1, further comprising a step of calculating said predetermined size of said font sample according to a size set in a font size controller, prior to said step of determining whether the preview window is currently displayed on said screen.

3. The method as set forth in claim 1, further comprising steps of:

determining whether an end key on a keyboard of said computer system has been activated;

returning to said step of determining whether one of said fonts is selected from said font list, when it is determined that said end key has not been activated; and ending said step of displaying the font list, when it is determined that said end key has been activated.

* * * * *